Feb. 8, 1966    W. A. DE VELLIER    3,233,500
SCREW WITH MAIN SHANK THREADS OF A GIVEN PITCH
MERGING WITH THREADS OF UNLIKE PITCH
ON A TAPERED BOTTOM END
OF THE SCREW SHANK

Filed Oct. 23, 1962    2 Sheets-Sheet 1

WILLIAM A. deVELLIER
*INVENTOR.*

BY James D. Girnan
ATTY

Feb. 8, 1966 W. A. DE VELLIER 3,233,500
SCREW WITH MAIN SHANK THREADS OF A GIVEN PITCH
MERGING WITH THREADS OF UNLIKE PITCH
ON A TAPERED BOTTOM END
OF THE SCREW SHANK

Filed Oct. 23, 1962 2 Sheets-Sheet 2

WILLIAM A. deVELLIER
*INVENTOR.*

BY James L. Givnan
ATT'Y

United States Patent Office 3,233,500
Patented Feb. 8, 1966

3,233,500
SCREW WITH MAIN SHANK THREADS OF A GIVEN PITCH MERGING WITH THREADS OF UNLIKE PITCH ON A TAPERED BOTTOM END OF THE SCREW SHANK
William A. DeVellier, Hollywood, Calif., assignor to American Fastener Corporation, a corporation of Nevada
Filed Oct. 23, 1962, Ser. No. 232,401
1 Claim. (Cl. 85—46)

This invention relates to new and useful improvements in threaded fasteners such as screws and the like.

The principal objects of the invention are:

To provide a screw having a pointed end with threads of less pitch than that of the main threads on the cylindrical shank of the screw, and wherein the threaded pointed end will cause the screw to be centered properly and to travel in a straight line after being started in a workpiece. As a consequence thereof, the screw will drive straight without wobble or drift resulting in less slipping of the driver and less surface scarring from such slips.

To provide a screw of the character described with at least one off-center chip-slot extending throughout the length of the main threads thereof, and one which when driven will be stabilized in balanced driving by the self-drilling pointed end against the off-center drag of the chip slot.

To provide a screw wherein the terminus of the threaded pointed end thereof is characterized by an incisor means to facilitate initial entry and self-centering of that end in a workpiece without the necessity of predrilling a pilot hole as heretofore, and whereafter the threaded pointed end will pull the screw into the work-piece in the manner of a wood auger bit.

Another feature of the invention resides in the fact the threaded pointed end also serves the purpose drilling its own pilot hole or holes through two overlying workpieces thus eliminating the necessity of aligning the holes, if drilled separately, preparatory to the screw driving operation.

A further object of the invention is the provision of a screw of the character described wherein the improvements above pointed out will function with equal effectiveness in single threaded screws as in those provided with double or parallel twin threads known in the industry by the tradename "Twin Fast," and wherein the threads start at the single, centered point, spiral the root in parallel formation and end opposite sides of the shank.

Accordingly, the invention comprehends the use of single threads on the shank merging with single threads on the pointed end; double threads on the shank merging with single threads on the pointed end and conversely: single threads on the shank merging with double threads on the pointed end.

The foregoing and other objects and advantages which will become subsequently apparent reside in the details of construction and operation as more fully hereinafter described and claimed, reference being had to the accompanying drawings forming a part hereof and in which:

Figure 1:
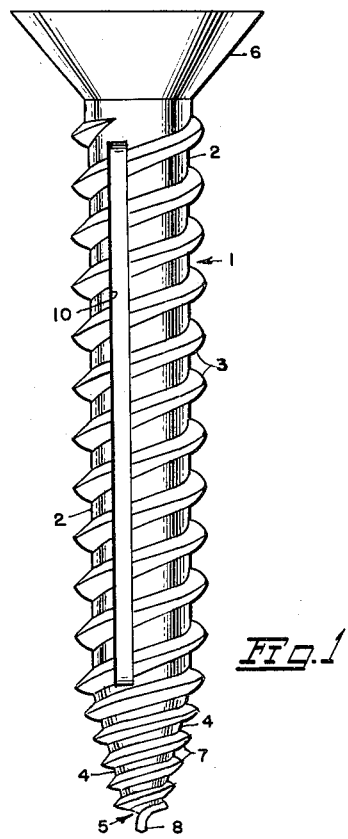
FIGURE 1 is an elevational view of a screw made in accordance with my invention.
Figure 2:
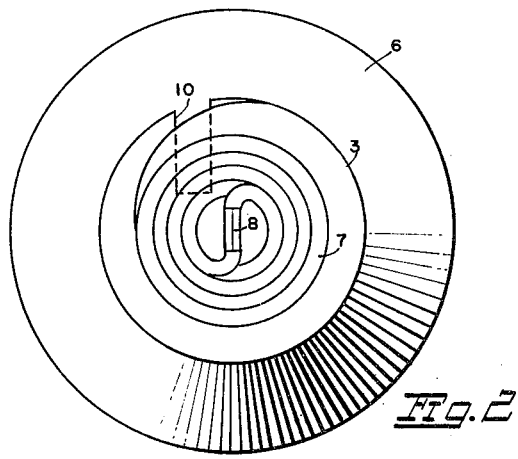
FIGURE 2 is a bottom end view of FIGURE 1 on an enlarged scale.

With continuing reference to the drawings, wherein like reference numerals designate like parts, and particularly FIGURES 1 and 2 thereof, reference numeral 1 indicates generally a screw having a cylindrical shank 2 of uniform diameter provided with main threads 3, and tapered as at 4 to a pointed bottom end indicated generally at 5.

The top end of the screw shank is formed with a head 6 which is exemplary of any of the various well-known standard types and which forms no part of this present invention.

The tapered bottom end 4 of the screw shank 2, is provided with threads 7 of gradually diminishing major diameter and of less pitch than that of the main threads 3. The main threads 3 are, preferably, though not restrictively, of the order of 12 to the inch or variations therefrom as determined by experiment to provide full thread engagement for high holding strength and the threads 7 are of the order of 18 to the inch.

As above pointed out the main threads may be of the single type merging with threads 7 of the single type or single threads 3 could merge with double threads 7. The threads 3 could also be double, merging with single threads 7, or both threads 3 and 7 could be double.

As best illustrated, in FIGS. 1 and 2, I provide a single chip-receiving slot 10 extending substantially throughout the length of the cylindrical shank 2 and the threads 3 therearound, and terminating at its bottom end at or within the top end of the tapered portion 4 of the shank. The bottom end of the tapered point forming portion of the shank terminates in a diametrically disposed blade-like or incisor means 8 for puncturing the surface of a workpiece to serve as a starting or centering hole for the threads 7 which thereafter pull and guide the screw into the workpiece in a straight line without tilting.

The single chip-slot whether it be parallel to the axis of the screw shank as shown, or radially disposed relative thereto would set up a drag in the direction of rotation of a screw being driven and such drag would, of course, cause the screw to tilt away from a straight line drive, but such tilting is prevented by the tapering threads 7 at the bottom of the screw, which threads being continuous, uninterrupted, and in full driving engagement with the workpiece stabilize and hold the screw against any misalignment by the off-center pull or rotational drag of the single chip-slot. It is to be understood of course, that I do not wish to be limited to a single chip-slot, since obviously by providing two such slots, diametrically opposed, the rotational drag of one would counteract that of the other.

Figure 3:
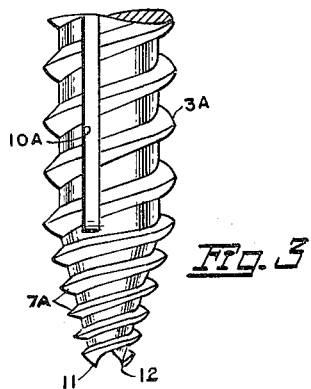
FIGURE 3 is a fragmentary view similar to FIGURE 1 showing a modification of the bottom end of the screw.
Figure 4:
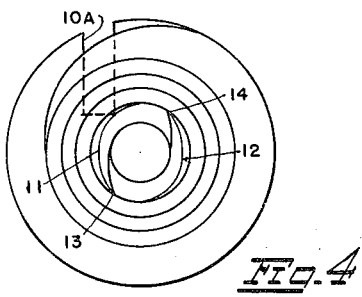
FIGURE 4 is a bottom end view of FIGURE 3 on an enlarged scale.

In the modification shown in FIGS. 3 and 4, the main threads 3A and 7A are the same as those shown and described in connection with FIG. 1 as is also the chip-slot 10A. The tapered bottom end of the screw instead of terminating in a blade-like means as at 8 in FIG. 1, is defined by two diametrically opposed arcuate cutting edges 11 and 12 terminating in pointed ends 13 and 14 respectively adapted to cut a starting or centering hole for the same purpose as the function of blade-like means 8. Thereafter the threads 7A being continuous and uninterrupted by the chip-slot, will perform the same function as the threads 7 by pulling the screw into the workpiece in a straight line without tilting or wobbling.

Figure 5:
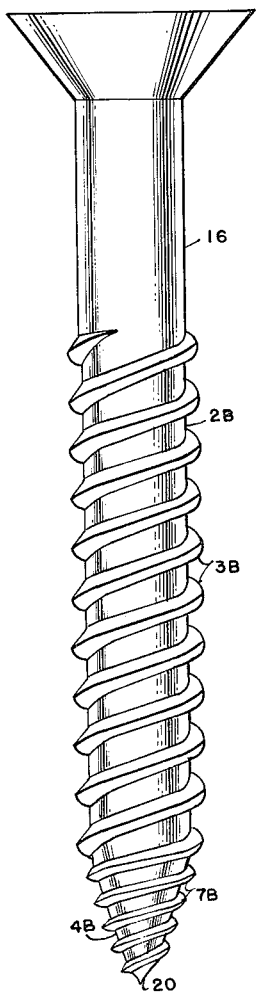
FIGURE 5 is an elevational view of a modification of FIGURE 1.

The upper end 16 of the shank 2B of the wood screw shown in FIG. 5, is relieved relative to the major diameter of the main threads 3B to eliminate any wedging action which might result in splitting soft and brittle workpieces. The threads of this wood screw may be of the same variations or combinations as those described in connection with FIG. 1 but the chip-slot is eliminated and the main threads 3B are of greater pitch than those (7B) of the tapered bottom end portion 4B. The bottom end of the tapered portion may terminate in a conventional point 20, as shown, or in either of the incisor or cutting points shown in FIGS. 2 and 4.

Here as in the other forms of the invention, the threads of lesser pitch at the tapered bottom end 4B of the shank result in proper centering of the screw and a straight line drive thereafter.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

A fastening element having
a shank of uniform diameter;
a head at the upper end of the shank;
a tapered point-forming portion extending co-axially from the lower end of the shank;
a pair of parallel or twin threads of similar uniform pitch extending spirally along the shank from adjacent the upper end of the shank to the lower end of the shank;
a pair of threads continuing from the lower ends of the shank threads and extending spirally downward on the tapered point-forming portion, the threads on the tapered point-forming portion having a lesser pitch than the threads on the shank and terminating at a puncturing end;
and a single chip-receiving slot extending lengthwise in said shank above said tapered point-forming portion, said chip-receiving slot lying in a plane parallel to and laterally displaced from the axis of said shank.

References Cited by the Examiner

UNITED STATES PATENTS

| | | | |
|---|---|---|---|
| 65,651 | 6/1867 | Davies | 85–46 |
| 408,531 | 8/1889 | Rogers | 85–46 |
| 551,354 | 12/1895 | Lee | 85–47 |
| 635,297 | 10/1899 | Caldwell | 85–46 |
| 1,651,796 | 12/1927 | Arenz | 85–46 |
| 1,749,903 | 3/1930 | Cannon | 85–46 |
| 1,909,476 | 5/1933 | Trotter | 85–47 |
| 2,314,391 | 3/1943 | DeVellier | 85–46 |

FOREIGN PATENTS

| | | |
|---|---|---|
| 167,620 | 8/1921 | Great Britain. |
| 466,039 | 5/1937 | Great Britain. |

EDWARD C. ALLEN, *Primary Examiner.*